US009189808B2

(12) United States Patent
Baba

(10) Patent No.: US 9,189,808 B2
(45) Date of Patent: Nov. 17, 2015

(54) MONITORING APPARATUS, MONITORING METHOD, AND STORAGE MEDIUM FOR ACQUIRING COUNTER INFORMATION FROM AN IMAGE FORMING APPARATUS

(71) Applicant: CANON KABUSHIKI KAISHA, Tokyo (JP)

(72) Inventor: Shohei Baba, Nishitokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 13/647,233

(22) Filed: Oct. 8, 2012

(65) Prior Publication Data

US 2013/0094054 A1 Apr. 18, 2013

(30) Foreign Application Priority Data

Oct. 13, 2011 (JP) ................................ 2011-226041
Sep. 7, 2012 (JP) ................................ 2012-197268

(51) Int. Cl.
*G06F 3/12* (2006.01)
*G06Q 30/04* (2012.01)
*G03G 15/00* (2006.01)

(52) U.S. Cl.
CPC ............ *G06Q 30/04* (2013.01); *G03G 15/5079* (2013.01)

(58) Field of Classification Search
CPC .................................................. G03G 15/5079
USPC ........................................................ 358/1.15
See application file for complete search history.

(56) References Cited

U.S. PATENT DOCUMENTS

2004/0133890 A1* 7/2004 Fukuda ........................ 718/100
2006/0215184 A1* 9/2006 Murakami ..................... 358/1.1
2008/0074698 A1* 3/2008 Richter et al. ............... 358/1.15
2009/0290190 A1* 11/2009 Torii ........................... 358/1.15
2010/0067036 A1* 3/2010 Oka ............................ 358/1.14
2010/0225945 A1* 9/2010 Hatano ........................ 358/1.13
2012/0069394 A1* 3/2012 Ono ............................ 358/1.15

FOREIGN PATENT DOCUMENTS

JP 2007-18500 A 1/2007

* cited by examiner

*Primary Examiner* — Benjamin O Dulaney
(74) *Attorney, Agent, or Firm* — Canon USA, Inc., IP Division

(57) ABSTRACT

A monitoring apparatus that acquires counter information from an image forming apparatus includes a transmission unit configured to transmit a snapshot generation job to the image forming apparatus, a reception unit configured to receive a completion notification indicating completion of the snapshot generation job, and an acquisition unit configured to acquire the snapshot indicating the counter information from the image forming apparatus in response to reception of the completion notification, wherein the snapshot generation job is managed with a queue for a job related to printing processing and is restricted from being canceled by general user authority.

5 Claims, 14 Drawing Sheets

FIG.10A

| ID | USER NAME | APPARATUS NAME | PRINT COMMAND | . . . . |
|---|---|---|---|---|

FIG.10B

| ID | APPARATUS NAME | SNAPSHOT GENERATION COMMAND | . . . . |
|---|---|---|---|

MONITORING APPARATUS, MONITORING METHOD, AND STORAGE MEDIUM FOR ACQUIRING COUNTER INFORMATION FROM AN IMAGE FORMING APPARATUS

BACKGROUND OF THE INVENTION

1. Field of the Invention

The present invention relates to a technique which manages counter information accumulated according to an execution of a job in an image forming apparatus such as a printer and a copying machine.

2. Description of the Related Art

Until now, in general, counter information indicating the number of printed sheets has been acquired from an image forming apparatus such as a copying machine so as to be used for periodical charging and maintenance work. For the charging, department charging and user charging have widely prevailed.

A case is assumed where printing is performed by an image forming apparatus while counter information for each department/user and total counter information are sequentially acquired from an external apparatus via a network. In this case, the sum of the acquired counter information for each department/user is not consistent with the total counter information. The counter information in which such inconsistency occurs is inappropriate to be used for charging to a user.

Japanese Patent Application Laid-Open No. 2007-18500 discusses a technique which ensures that a charging counter is not acquired while printing is being performed. In Japanese Patent Application Laid-Open No. 2007-18500, total counter information is first acquired and then a counter required for charging is acquired and the total counter information is acquired again. If there is no difference between the former and the latter total counter information, the charging counter is regarded as effective.

Although the above conventional technique is capable of acquiring counter information appropriate for use in charging, delay in acquiring appropriate counter information sometimes occurs while a user is performing a large amount of printing in acquiring a counter, for example. Then, it seems to be desirable to provide a different technique for acquiring the appropriate counter information without delay due to job processing such as printing and copying.

SUMMARY OF THE INVENTION

The present invention is directed to a monitoring apparatus for acquiring counter information from an image forming apparatus.

According to an aspect of the present invention, a monitoring apparatus that acquires counter information from an image forming apparatus includes a transmission unit configured to transmit a snapshot generation job for generating a snapshot indicating the counter information to the image forming apparatus, a reception unit configured to receive a completion notification indicating completion of the snapshot generation job, and an acquisition unit configured to acquire the snapshot indicating the counter information from the image forming apparatus in response to reception of the completion notification, wherein the snapshot generation job is managed with a queue for a job related to printing processing and is restricted from being canceled by general user authority.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A and 10B illustrate schematic diagrams of job data.

DESCRIPTION OF THE EMBODIMENTS

Various exemplary embodiments, features, and aspects of the invention will be described in detail below with reference to the drawings.

Figure 1:
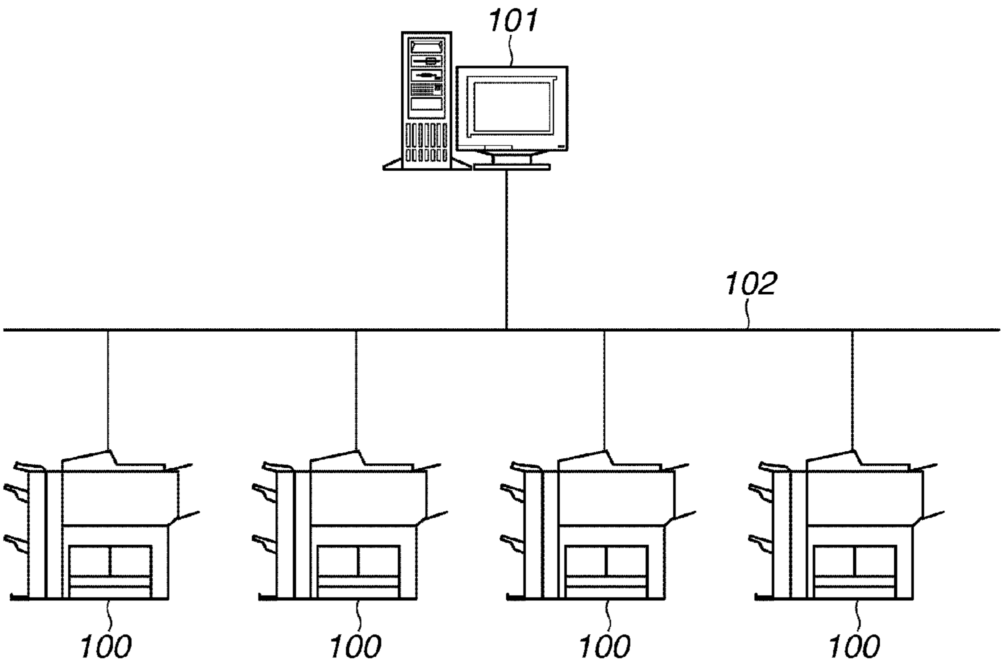
FIG. 1 is a schematic diagram of a system according to an exemplary embodiment of the present invention.

FIG. 1 is a schematic diagram illustrating a configuration of a system assumed in the present invention.

In FIG. 1, the system includes an image forming apparatus 100 such as a printer or a copying machine and a monitoring apparatus 101 for managing operation status such as counter information of the image forming apparatus 100. The monitoring apparatus 101 transmits operation information including failure information or counter information to a central management apparatus (not illustrated) and receives the monitoring schedule of the image forming apparatus to collaboratively manage and maintain the image forming apparatus 100.

FIG. 1 illustrates a state where a plurality of the image forming apparatuses 100 is connected with the monitoring apparatus 101 via a local area network (LAN) 102. However, the monitoring apparatus 101 may exist on an external network via the Internet and the image forming apparatus 100 may be connected with the monitoring apparatus 101 via the Internet.

Figure 2:
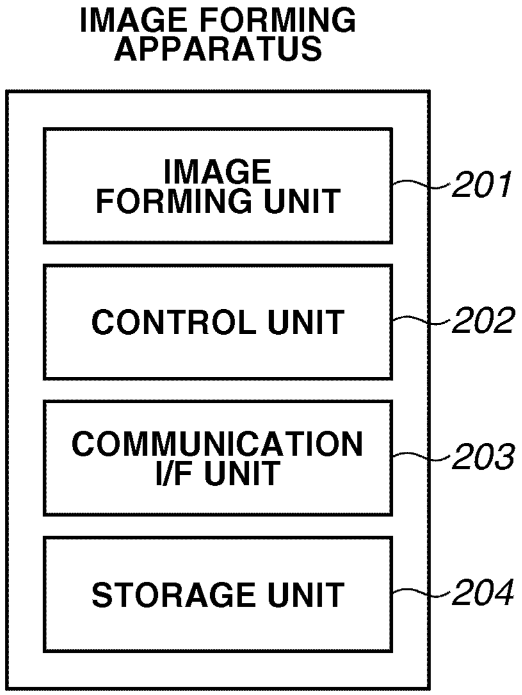
FIG. 2 illustrates a configuration of hardware of an image forming apparatus according to the present invention.

FIG. 2 illustrates an example of a configuration of hardware of the image forming apparatus 100.

The image forming apparatus 100 includes an image forming unit 201, a control unit 202, a communication I/F 203, and a storage unit 204.

The image forming unit 201 includes a part or all of a printer and a scanner. A control unit 202 controls the entire image forming unit 201 such as an image forming control for controlling the image forming unit 201 and an operation information storage control of the image forming unit 201. The communication I/F 203 is a network interface connected with the LAN 102 to transmit the operation information to the monitoring apparatus 101. The storage unit 204 includes a read only memory (ROM), a random access memory (RAM), and a hard disk drive (HDD) and is used as an area for storing image data, operation information, and user management information.

Figure 3:
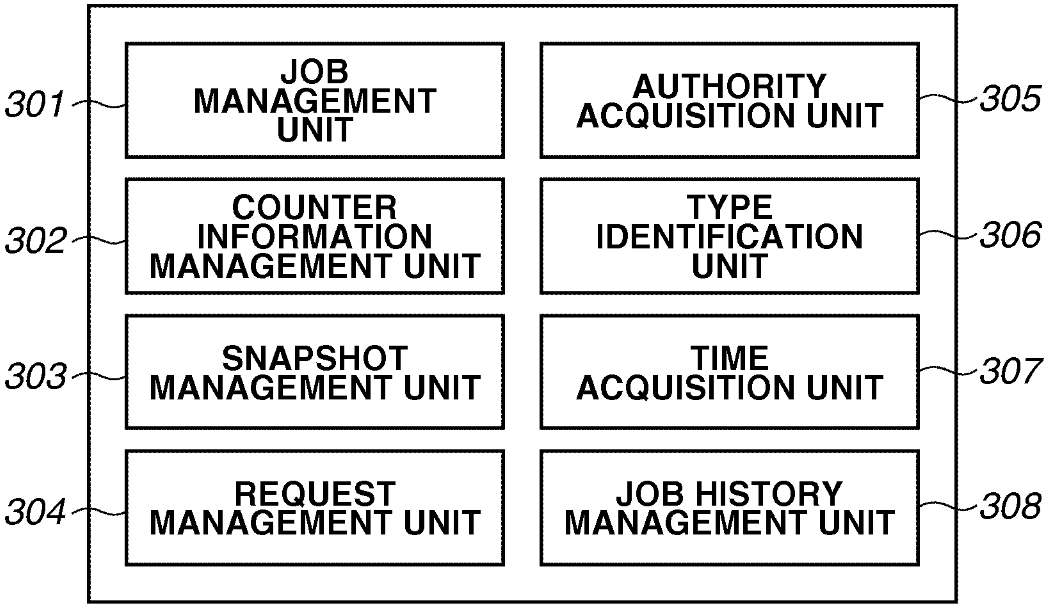
FIG. 3 illustrates a configuration of software of the image forming apparatus according to the present invention.

FIG. 3 illustrates an example of a configuration of software of the image forming apparatus 100 according to the present exemplary embodiment.

A job management unit 301 receives a print job and a snapshot generation job which are sent from an external apparatus (such as a client apparatus not illustrated and the monitoring apparatus 101) via the communication I/F 203 and registers the job in a job queue. The job management unit 301 controls execution sequence of a job registered in the job queue and performs control operations for suspending, resuming, and deleting the job in the job queue. Moreover, the job management unit 301 transmits a completion notification to the monitoring apparatus 101 via the communication I/F 203 when completing the snapshot generation job.

The snapshot generation job is the one that generates a snapshot indicating the operation information including counter information at a time when a job is executed, but not the one that performs image forming such as printing. In order to surely record counter information at a specific time, it is effective, for example, to set the snapshot generation job to restrict operation such as deletion by authority of a general user and not to allow an external application to refer thereto. The snapshot may be managed as a file in a specific format including the operation information including counter information.

A counter information management unit 302 manages the operation information including counter information such as the number of sheets/sides printed according to an execution of a print job and the number of times of operation of consumables such as components of the image processing apparatus. A snapshot management unit 303 stores the snapshot indicating the operation information at a specific time in the storage unit 204 and manages the snapshot.

A request management unit 304 receives various requests from the monitoring apparatus 101 and others on the network via the communication I/F 203, and manages the requests. An authority acquisition unit 305 acquires authority of the monitoring apparatus 101 and others acting as a request source in a request in, for example, generating the snapshot.

A type identification unit 306 identifies a type of operation information which needs to be available in accordance with the authority of a request source such as the operation information. A time acquisition unit 307 acquires current date and time. A job history management unit 308 manages a history of a print job.

Figure 4:
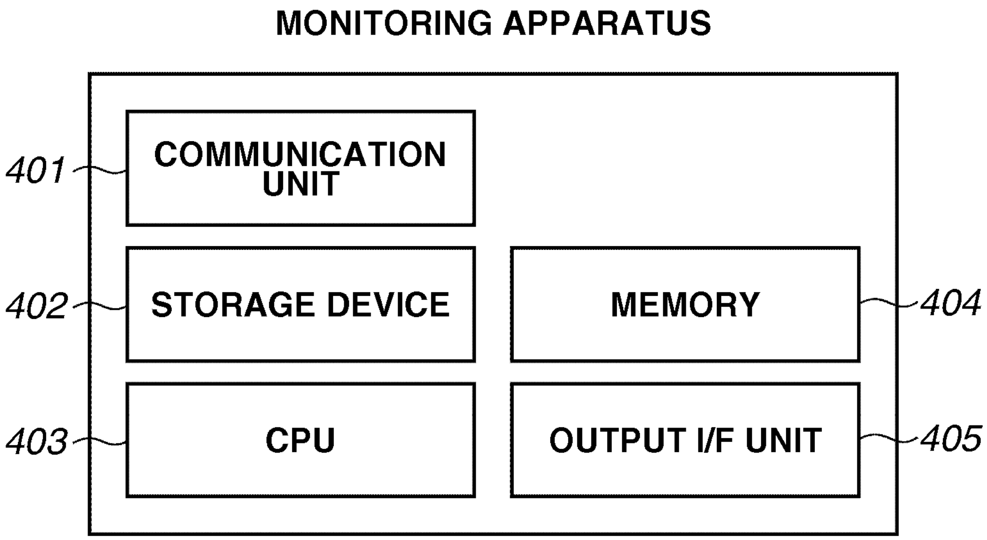
FIG. 4 illustrates a configuration of hardware of a monitoring apparatus according to the present invention.

FIG. 4 is a block diagram of hardware of the monitoring apparatus 101.

The monitoring apparatus 101 includes a communication unit 401, a storage device 402, a central processing unit (CPU) 403, a memory 404, and an output I/F unit 405.

The communication unit 401 is a network interface connected with the LAN 102 to transmit various requests to the image forming apparatus 100 or to acquire the operation information of the image forming apparatus 100. The storage device 402 stores an operating system (OS) and an acquisition and management program of the counter information of the image forming apparatus 100.

The CPU 403 loads the program from the storage device 402 to the memory 404 and executes the program. The output I/F unit 405 connects with a display and outputs results of execution of the program.

Figure 5:
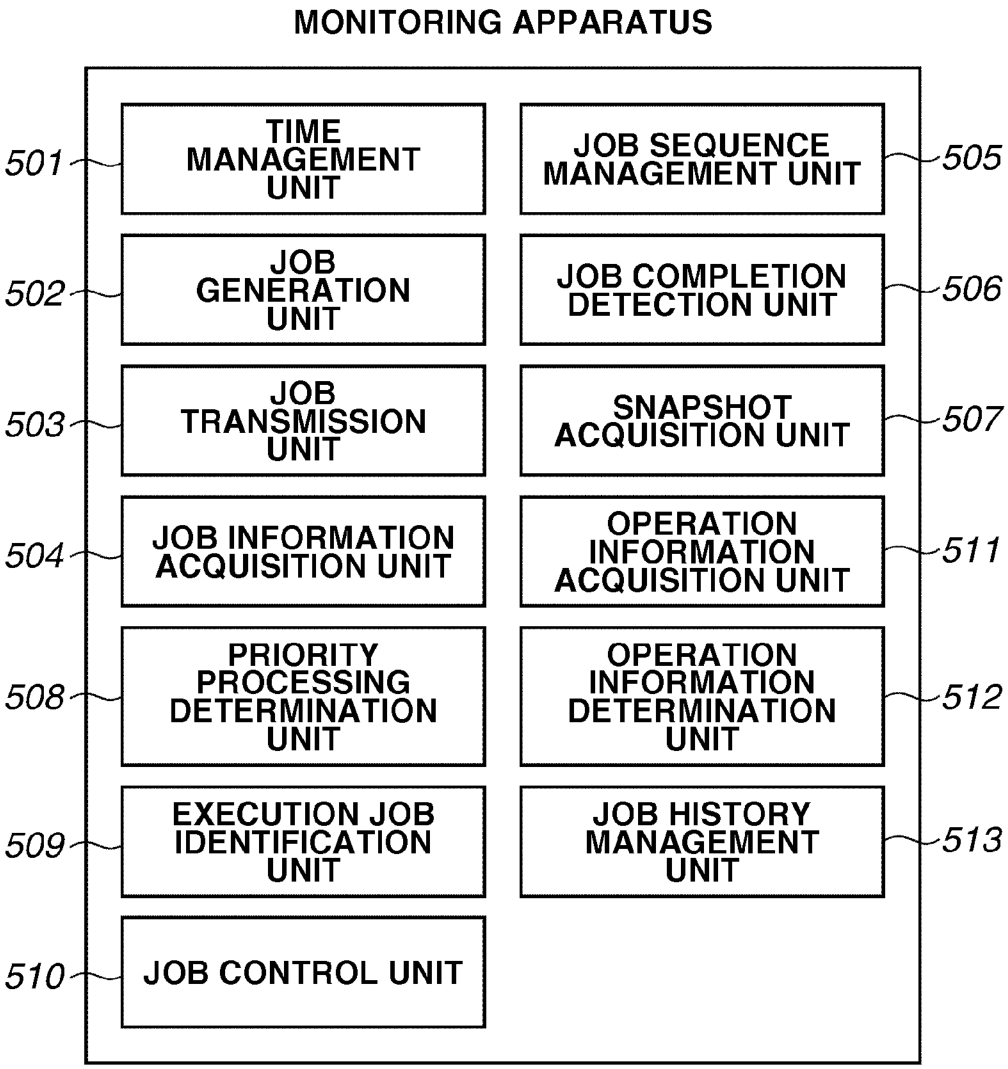
FIG. 5 illustrates a configuration of software of the monitoring apparatus according to the present invention.

FIG. 5 illustrates an example of a configuration of software of the monitoring apparatus 101 according to the present exemplary embodiment.

A time management unit 501 acquires a time required for generating the snapshot, a time required for acquiring the snapshot from the image forming apparatus 100, and a current time, and manages them. The time management unit 501 calculates the date and time when the snapshot needs to be acquired from the image forming apparatus 100 based on the closing date and time for the collection of the operation information or the date and time when the operation information is transmitted to the central management apparatus. The time management unit 501 calculates the time for processing each job from job information acquired by a job information acquisition unit 504 described below.

A job generation unit 502 generates the snapshot generation job. A job transmission unit 503 transmits the snapshot generation job to the image forming apparatus 100 via the communication unit 401. The job information acquisition unit 504 acquires information about job history from the image forming apparatus 100.

A job sequence management unit 505 determines a sequence of executing the snapshot generation job based on a current time, a process time for each job, and a time required for generating a snapshot to allow executing the snapshot at a time close to the date and time when the snapshot is acquired. The job sequence management unit 505 requests the image forming apparatus 100 to change the sequence in the job queue of the snapshot generation job to the above sequence if needed via the communication unit 401.

A job completion detection unit 506 detects completion of the snapshot generation job according to the completion notification received from the image forming apparatus 100. A snapshot acquisition unit 507 requests the image forming apparatus 100 to send the snapshot when the job completion detection unit 506 detects the completion of the snapshot generation job, and acquires the snapshot.

Figure 6:
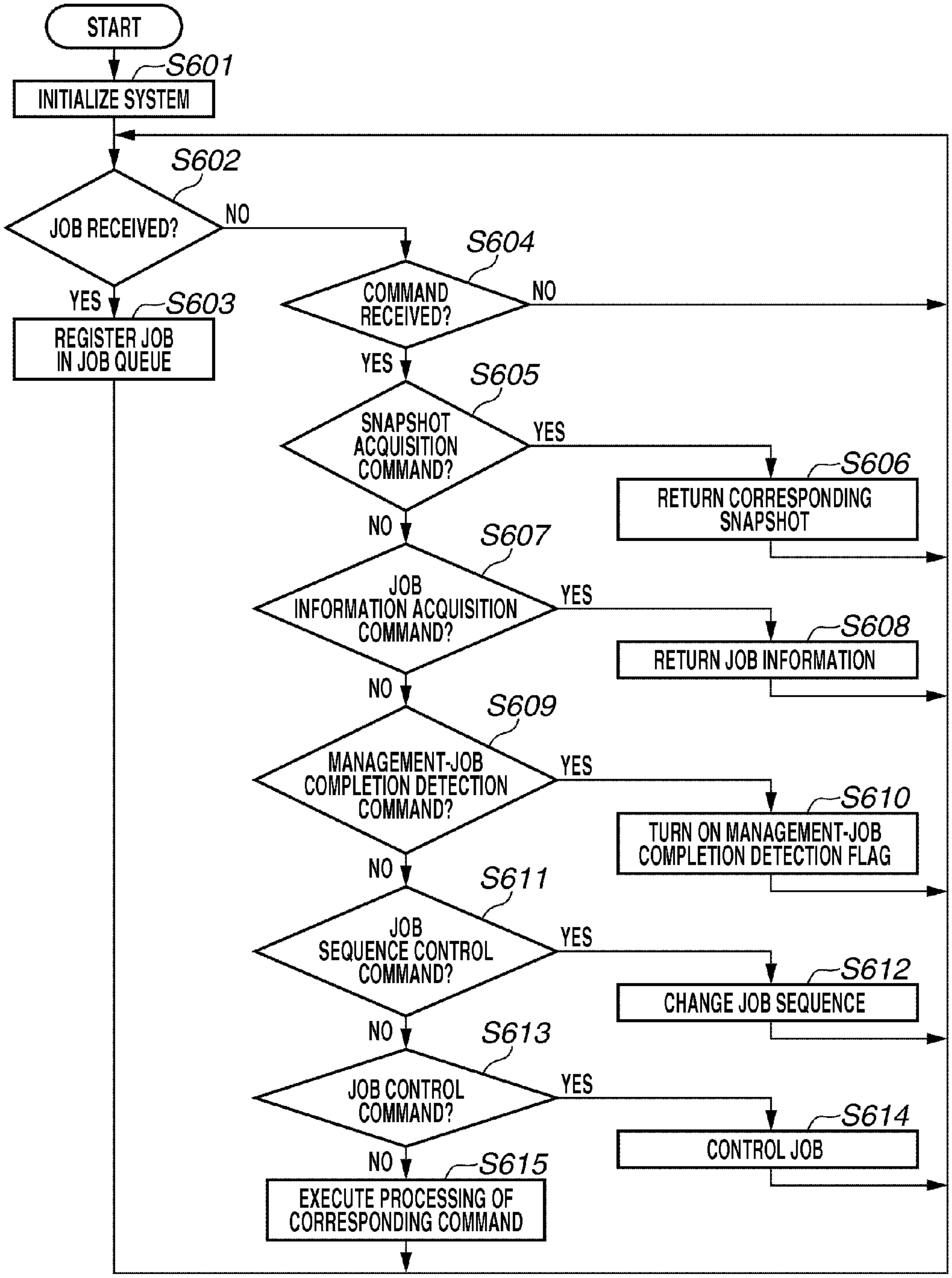
FIG. 6 is a flowchart illustrating overall processing of the image forming apparatus according to a first exemplary embodiment.

FIG. 6 is a flowchart illustrating overall processing of the image forming apparatus according to a first exemplary embodiment.

In step S601, necessary initializing processing for operating various programs in the image forming apparatus 100 is performed. The processing includes the initialization of communication processing for communicating with the monitoring apparatus 101, the acquisition of system setting, the initialization of a variable, and turning "OFF" a management job completion detection flag described below. Not only a completion status but also other statuses (error and others) may be detected as a job status.

If the request management unit 304 receives a job (YES in step S602), the processing proceeds to step S603. In step S603, control is performed to store the job received by the request management unit 304 in a job queue. If the request management unit 304 does not receive a job (NO in step S602), but receives a command (YES in step S604), the processing proceeds to step S605. Otherwise (NO in step S604), the processing returns to step S602 to wait for the reception of a job or a command.

In step S605, it is determined whether the command received by the request management unit 304 is a snapshot acquisition command. If the command is the snapshot acquisition command (YES in step S605), the processing proceeds to step S606. Otherwise (NO in step S605), the processing proceeds to step S607. In step S606, the snapshot management unit 303 returns the corresponding snapshot stored in the storage unit 204 to a command issue source (the monitoring apparatus 101 in the present exemplary embodiment).

In step S607, it is determined whether the command received by the request management unit 304 is a job information acquisition command. If the command is the job information acquisition command (YES in step S607), the processing proceeds to step S608. Otherwise (NO in step S607), the processing proceeds to step S609. In step S608, the job management unit 301 acquires job information stored in the storage unit 204 and returns the job information to the monitoring apparatus 101 being the command issue source.

In step S609, it is determined whether the command received by the request management unit 304 is a management-job completion notification command. If the command is the management-job completion notification command (YES in step S609), the processing proceeds to step S610. Otherwise (NO in step S609), the processing proceeds to step S611. In step S610, the request management unit 304 turns "ON" the management-job completion detection flag.

In step S611, it is determined whether the command received by the request management unit 304 is a job sequence control command. If the command is the job sequence control command (YES in step S611), the processing proceeds to step S612. Otherwise (NO in step S611), the processing proceeds to step S613. In step S612, the job management unit 301 changes a job sequence existing in the job queue in accordance with the command.

In step S613, it is determined whether the command received by the request management unit 304 is a job control command. If the command is a job control command (YES in step S613), the processing proceeds to step S614. Otherwise (NO in step S613), the processing proceeds to step S615. In step S614, the job management unit 301 performs controls for deleting, pausing, resuming the job registered in the job queue. The snapshot generation job is handled as a management job, so that the job control is restricted such as browsing and editing by an external application or deleting by a panel operation of the image forming apparatus.

In step S615, the request management unit 304 appropriately executes the corresponding processing excluding the above-described processing in accordance with the received command. Since the processing performed here is irrespective of the present exemplary embodiment, a detailed description is omitted.

Figure 7:
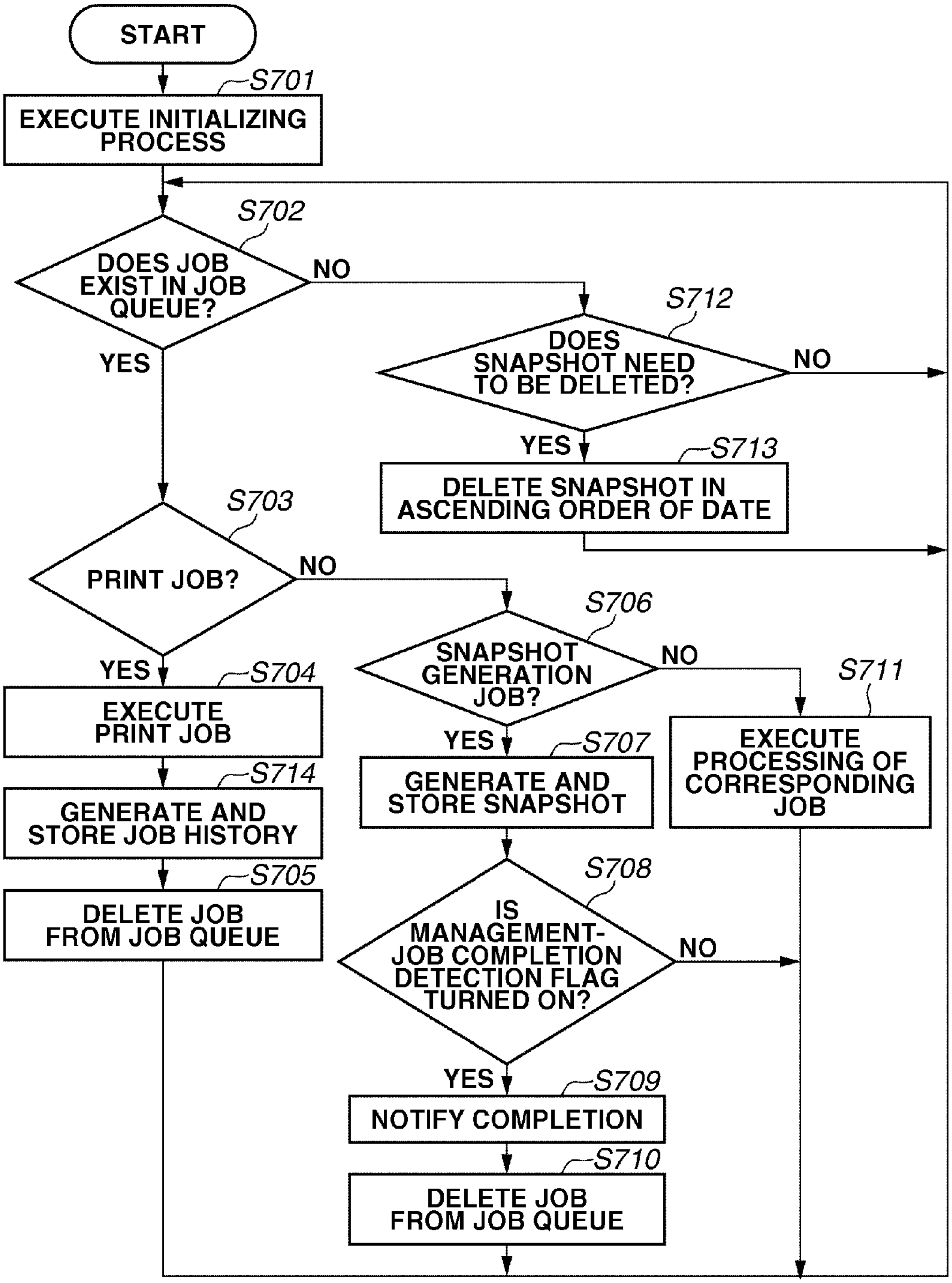
FIG. 7 is a flowchart of job processing in a job management unit according to the first exemplary embodiment.

An example of job processing in the job management unit 301 of the image forming apparatus 100 is described in detail below with reference to a flowchart illustrated in FIG. 7.

In step S701, a necessary initializing process for operating various programs in the job management unit 301 is executed.

In step S702, the job management unit 301 determines whether a job exists in the job queue. If the job exists therein (YES in step S702), the processing proceeds to step S703. Otherwise (NO in step S702), the processing proceeds to step S712.

In step S703, the job management unit 301 determines whether the job stored in the heading of the job queue is a print job. If the job is the print job (YES in step S703), the processing proceeds to step S704. Otherwise (NO in step S703), the processing proceeds to step S706.

In step S704, the job management unit 301 executes the print job and performs print processing. In step S714, the job history management unit 308 generates a history indicating the contents of the executed jobs, stores the history as a job history in the storage unit 204, and manages the job history. In step S705, the job management unit 301 deletes the print job whose print processing is completed from the job queue.

In step S706, the job management unit 301 determines whether the job stored in the heading of the job queue is the snapshot generation job. If the job is the snapshot generation job (YES in step S706), the processing proceeds to step S707. Otherwise (NO in step S706), the processing proceeds to step S711. In step S711, the job management unit 301 controls the execution of the processing corresponding to the corresponding job. Since the process performed here is irrespective of the present exemplary embodiment, a detailed description is omitted.

In step S707, the snapshot management unit 303 executes the snapshot generation job, acquires the snapshot indicating counter information, stores the snapshot with information for identifying a job in the storage unit 204, and manages the snapshot therewith.

In step S708, the job management unit 301 determines whether the completion detection flag is turned "ON". If the flag is turned "ON" (YES in step S708), the processing proceeds to step S709. Otherwise (NO in step S708), the processing returns to step S702. In step S709, the job management unit 301 notifies the monitoring apparatus 101 being the command issue source that the snapshot generation job is completed via the communication I/F 203. In step S710, the job management unit 301 deletes the snapshot generation job from the job queue.

In step S712, a snapshot exceeding a storage size or the number of storages is stored for a certain period of time and it is determined whether the snapshot needs to be deleted. If the snapshot needs to be deleted (YES in step S712), the processing proceeds to step S713. Otherwise (NO in step S713), the processing returns to step S702. In step S713, the snapshot management unit 303 deletes snapshots in ascending order of date and time when snapshots are generated.

Figure 8:
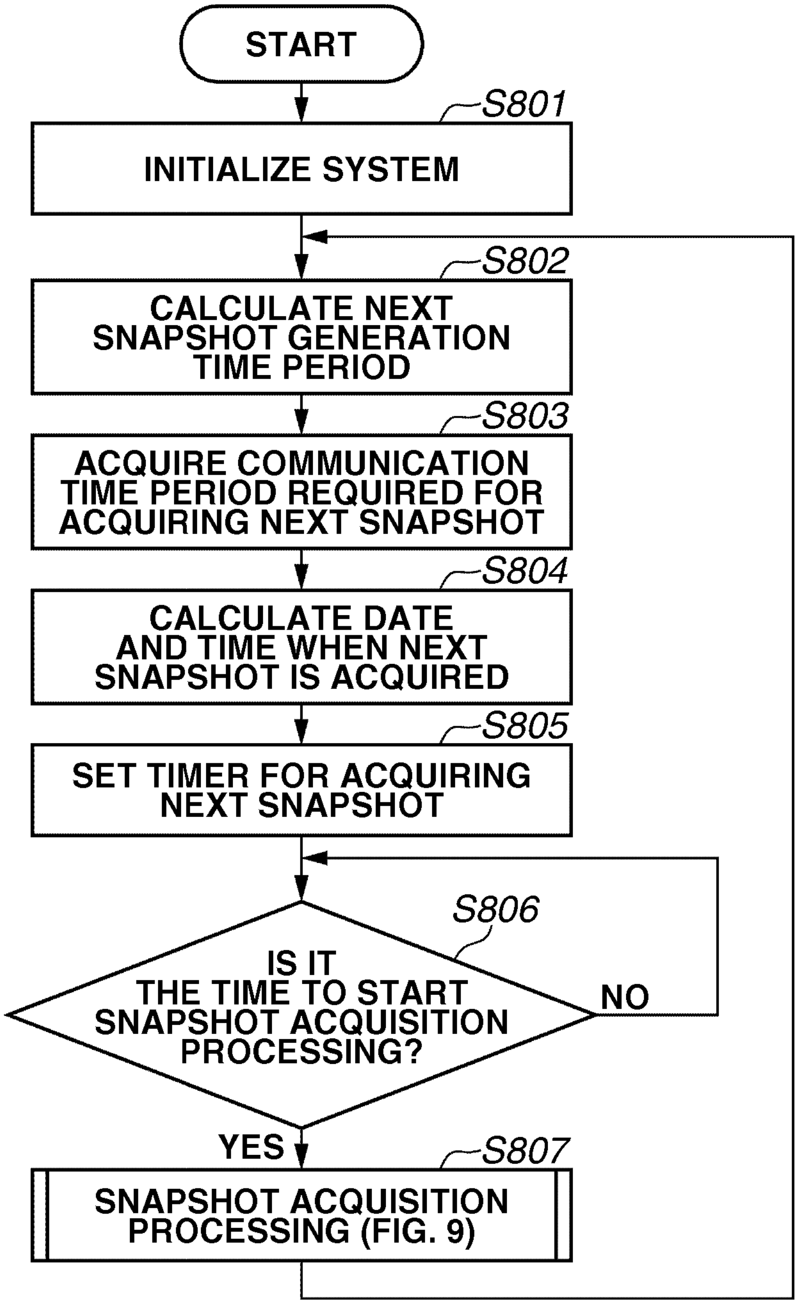
FIG. 8 is a flowchart illustrating overall processing of the monitoring apparatus according to the first exemplary embodiment.

An example of processing related to the acquisition of a snapshot of the monitoring apparatus 101 is described in detail below with reference to a flowchart illustrated in FIG. 8.

In step S801, an initializing process necessary for operating various programs in the monitoring apparatus 101 is performed. The process includes the initialization of communication processing for communicating with the image forming apparatus 100, the acquisition of system setting, and the initialization of a variable.

In step S802, the time management unit 501 calculates a time period required for generating a snapshot. In step S803, the time management unit 501 acquires a time period required for acquiring the snapshot from the image forming apparatus 100.

In step S804, the time management unit 501 calculates date and time when the snapshot is acquired from the image forming apparatus 100 based on the closing date and time for the collection of the operation information, the date and time when the operation information is transmitted to the central management apparatus, a time when the snapshot is generated, or communication time. In step S805, a timer for acquiring the snapshot is set.

In step S806, the monitoring apparatus 101 waits until the time comes when the acquisition of the snapshot needs to start. If it is the time to start snapshot acquisition processing (YES in step S806), the processing proceeds to step S807. In step S807, the snapshot acquisition unit 507 performs the snapshot acquisition processing.

Figure 9:
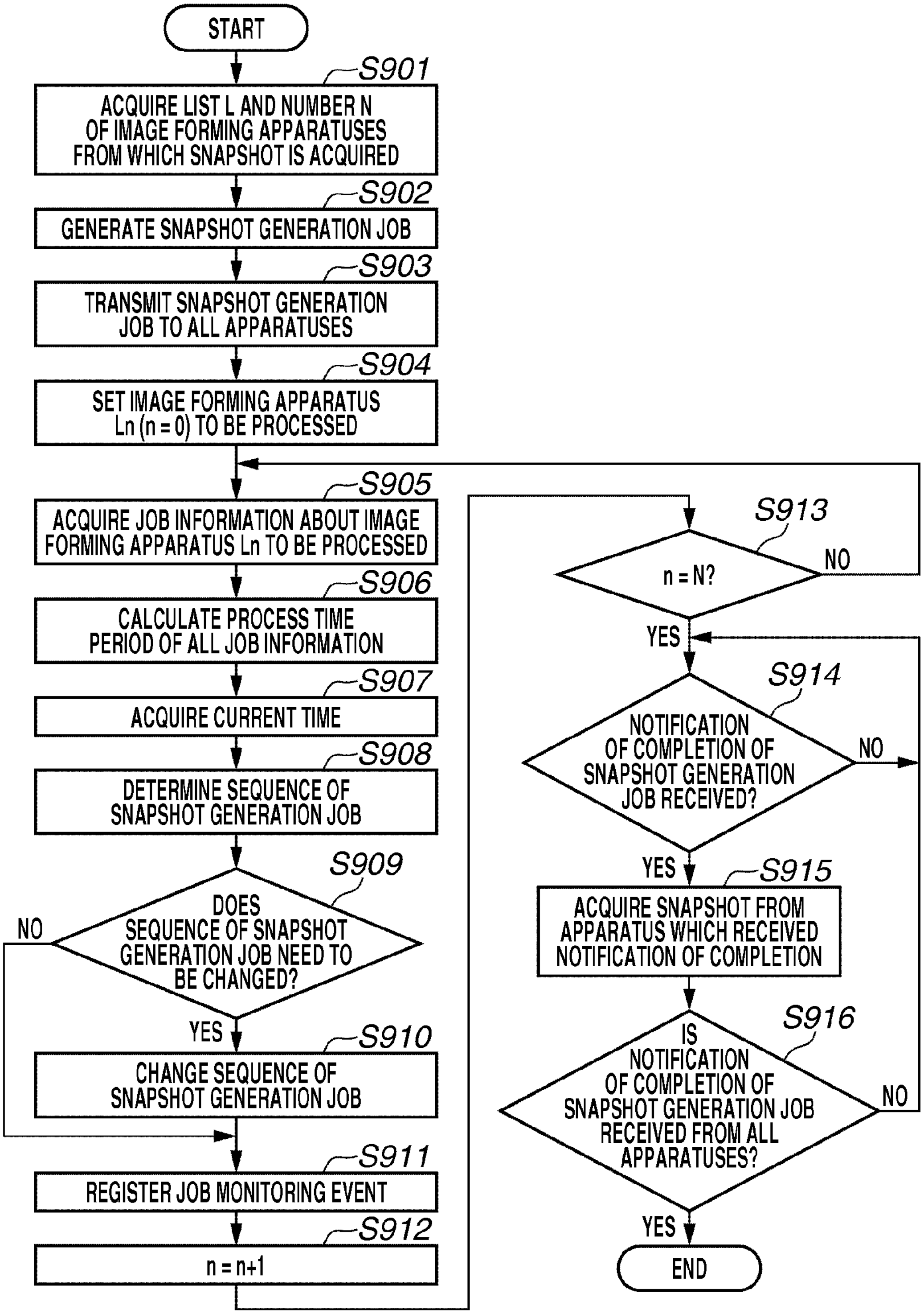
FIG. 9 is a flowchart illustrating snapshot acquisition processing in the monitoring apparatus according to the first exemplary embodiment.

An example of the snapshot acquisition processing of the monitoring apparatus 101 is described in detail below with respect to a flowchart illustrated in FIG. 9.

In step S901, a list L of the image forming apparatuses from which a snapshot is to be acquired and the number N of the image forming apparatuses are acquired. In step S902, the job generation unit 502 specifies a type of a counter to be acquired to generate the snapshot generation job.

The description content of a job is described below with reference to FIGS. 10A and 10B. FIG. 10A illustrates a general print job. FIG. 10B illustrates the snapshot generation job. Both of the jobs include an identification (ID) for identifying a job and apparatus information indicating an issuing source. The snapshot generation job includes a snapshot generation command used for specifying the type of target counter information.

In step S903, the job transmission unit 503 transmits the snapshot generation job illustrated in FIG. 10B to the image forming apparatus 100 via the communication unit 401. In step S904, the image forming apparatus Ln (n=0) to be processed is set. In step S905, the job information acquisition unit 504 acquires job information of the image forming apparatus Ln to be processed.

In step S906, the time management unit 501 calculates a time period required for processing information about all jobs acquired in step S905. In step S907, the time management unit 501 acquires current time.

In step S908, the job sequence management unit 505 determines a sequence of executing the snapshot generation job based on the current time, a process time for each job, a time required for generating the snapshot and the acquisition date and time of the snapshot to allow executing the snapshot generation job at a time close to the acquisition date and time of the snapshot.

In step S909, the job sequence management unit 505 determines whether the sequence of the snapshot generation job needs to be changed in the image forming apparatus 100. If the sequence needs to be changed (YES in step S909), the processing proceeds to step S910. In step S910, the job sequence management unit 505 changes the sequence of the snapshot generation job according to the determination made in step S908.

In step S911, the job completion detection unit 506 registers a monitoring event of the snapshot generation job in the image forming apparatus 100. In step S912, the job completion detection unit 506 increments the value of n by one to shift the image forming apparatus 100 to be processed to the next one. In step S913, the job completion detection unit 506 determines whether the value of n is equal to that of N to confirm whether the process of all image forming apparatuses 100 from which the snapshot generation job needs to be acquired is completed. If the process of all image forming apparatuses 100 is completed (YES in step S913), the processing proceeds to step S914 without returning to step S905.

In step S914, the job completion detection unit 506 determines whether to receive the completion notification of the snapshot generation job. The job completion detection unit 506 waits until the completion notification is received and if the job completion detection unit 506 receives the completion notification (YES in step S914), the processing proceeds to step S915. In step S915, the snapshot acquisition unit 507 requests the image forming apparatus 100 from which the completion notification is received to send the snapshot, and acquires the snapshot as a response.

In step S916, the job completion detection unit 506 determines whether to receive the completion notification of the snapshot generation job from all image forming apparatuses 100. If the job completion detection unit 506 receives the completion notification from all image forming apparatuses 100 (YES in step S916), the processing ends. If the job completion detection unit 506 does not receive the completion notification from all image forming apparatuses 100 (NO in step S916), the processing returns to step S914.

As stated above, according to the first exemplary embodiment, the monitoring apparatus 101 performs control so that the snapshot generation job is executed by the image forming apparatus 100 at an appropriate time to allow acquiring counter information at a necessary time.

In the first exemplary embodiment, a control for stopping a job in printing is not performed. If the top priority is given to the closing date and time of the counter, the snapshot may be acquired with the job in processing suspended.

A second exemplary embodiment is described below with reference to the drawings.

In the block diagram of software of the monitoring apparatus 101 in FIG. 5, portions particularly related to the present exemplary embodiment are described in detail below.

A priority processing determination unit 508 determines whether an acquisition date and time or a printing process by a user in the image forming apparatus 100 is prioritized with regard to the collection of the counter information. An execution job identification unit 509 identifies a job that is being executed based on the job information acquired by the job information acquisition unit 504.

A job control unit 510 requests the image forming apparatus 100 to suspend the executing job identified by the execution job identification unit 509. An operation information acquisition unit 511 performs a process for acquiring only a part of the operation information such as the counter information varying in printing from the image forming apparatus 100 during the suspension of a job. The job control unit 510 requests the image forming apparatus 100 to resume the job which is being suspended.

An operation information determination unit 512 performs a process in which a value of the operation information acquired by the operation information acquisition unit 511 is replaced with that of the snapshot for each item. A job history management unit 513 acquires history information about the print job from the image forming apparatus 100 and identifies a history of the job which is being executed at the date and time when the snapshot is acquired. The job history management unit 513 divides the identified job history into two job histories before and after the date and time when the snapshot is acquired based on the operation information acquired by the operation information acquisition unit 511 and the value of the snapshot.

Figure 11:
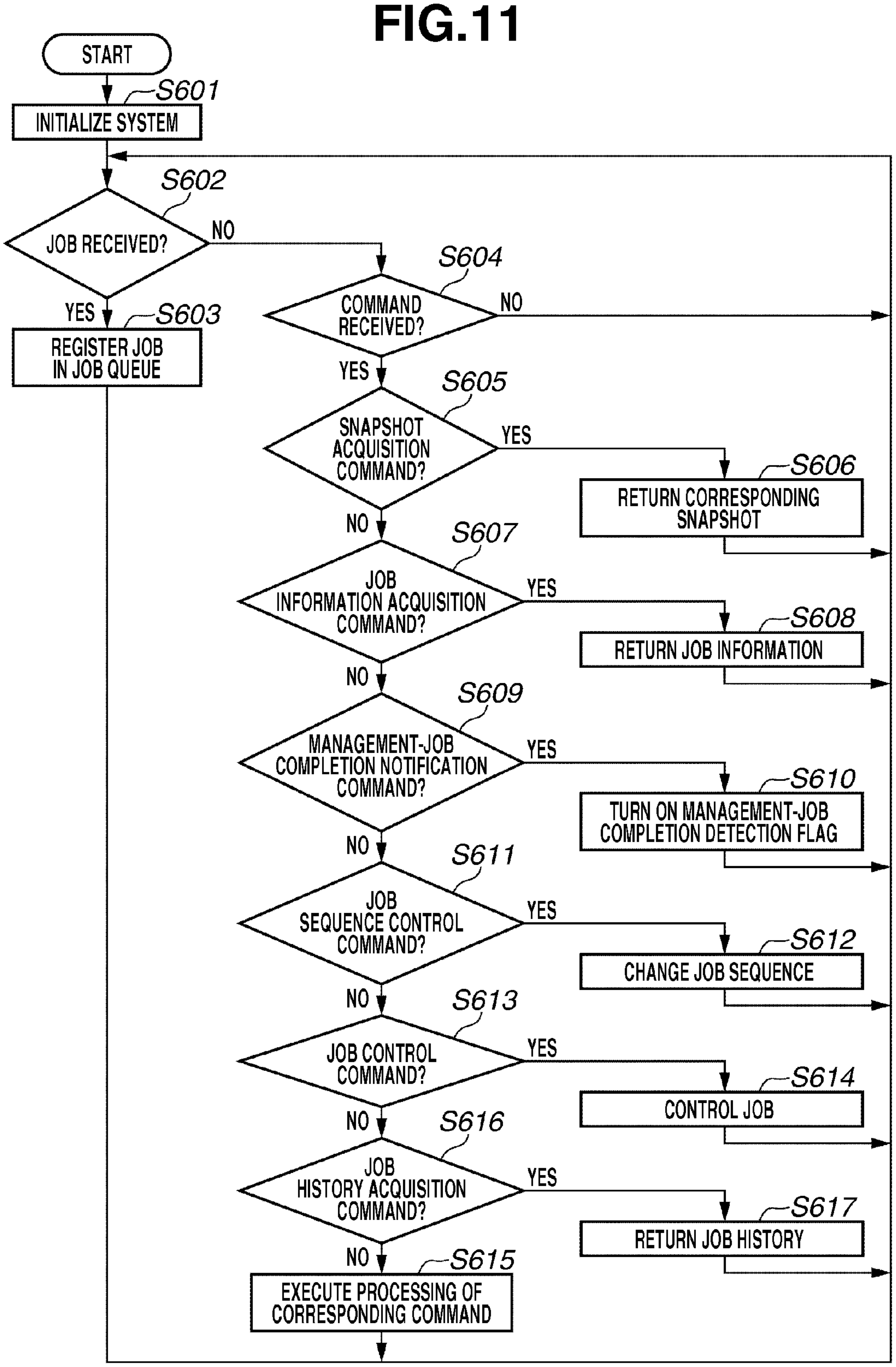
FIG. 11 is a flowchart illustrating overall processing of an image forming apparatus according to a second exemplary embodiment.

FIG. 11 is a flowchart illustrating an example of process for acquiring the counter information in the second exemplary embodiment. Steps S616 to S617 are added to the processing illustrated in FIG. 6. The added processing is described below with respect to FIG. 11.

In step S616, it is determined whether the command received by the request management unit 304 is a job history acquisition command. If the command is the job history acquisition command (YES in step S616), the processing proceeds to step S617 and the job history management unit 308 returns the job history of the print job to the apparatus which issues the command.

Figure 12:
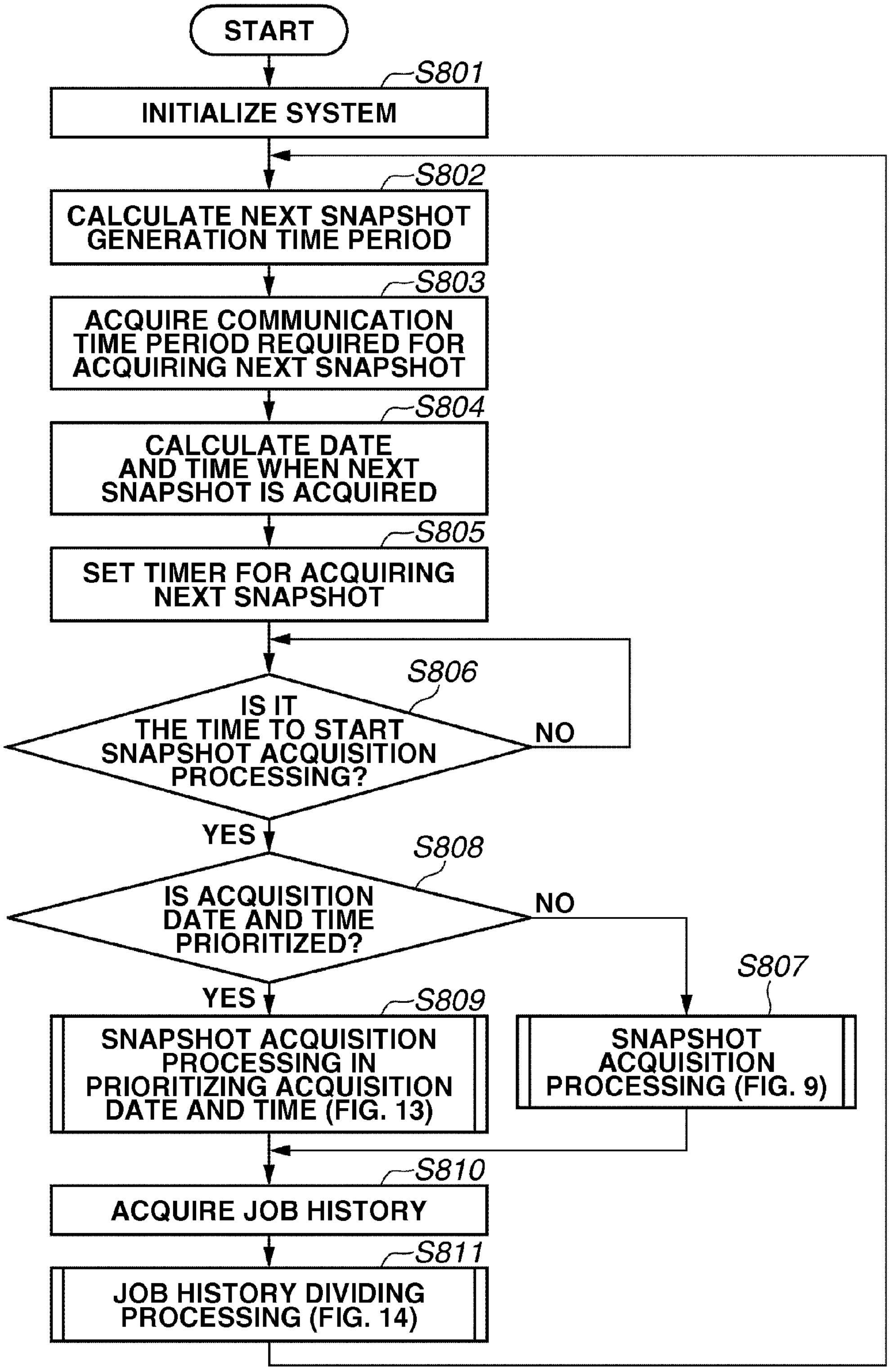
FIG. 12 is a flowchart illustrating overall processing of a monitoring apparatus according to the second exemplary embodiment.

FIG. 12 is a flowchart illustrating an example of processing of the monitoring apparatus 101 in the second exemplary embodiment. Steps S808 to S811 are added to the processing illustrated in FIG. 8. The added processing is described below with respect to FIG. 12.

In step S808, the priority processing determination unit 508 determines whether an acquisition date and time or a printing process is prioritized. If the acquisition date and time is prioritized (YES in step S808), the processing proceeds to step S809. Otherwise (NO in step S808), the processing proceeds to step S807. The priority is manually set by a manager in accordance with an operational policy such as charging.

In step S809, snapshot acquisition processing in prioritizing the acquisition date and time is performed. Such processing is described in detail below with reference to FIG. 13. In step S810, the job history management unit 513 acquires the job history from the image forming apparatus 100. In step S811, the job history management unit 513 performs a dividing processing such that a history corresponding to the job which is being executed is identified at a time of acquisition of the snapshot. The dividing processing is described in detail below with reference to FIG. 14.

Figure 13:
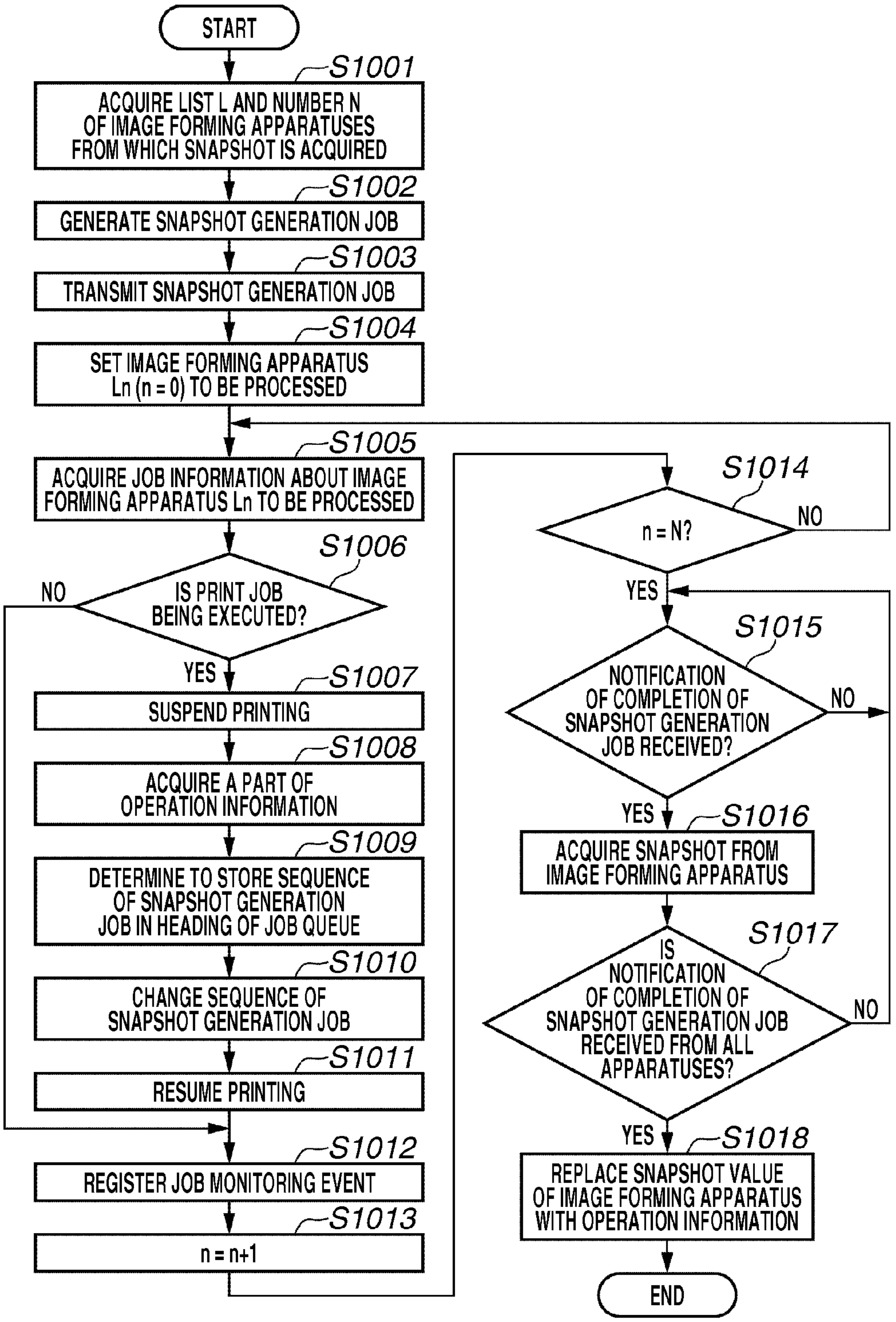
FIG. 13 is a flowchart illustrating snapshot acquisition processing in the monitoring apparatus according to the second exemplary embodiment.

An example of the snapshot acquisition processing in a case where the acquisition date and time is prioritized according to the present exemplary embodiment is described in detail below with respect to a flowchart illustrated in FIG. 13.

In step S1001, a list L of the image forming apparatuses from which a snapshot is acquired and the number N of the image forming apparatuses are acquired. In step S1002, the job generation unit 502 specifies a type of a counter to be acquired to generate the snapshot generation job. In step S1003, the job transmission unit 503 transmits the snapshot generation job to the image forming apparatus 100 via the communication unit 401.

In step S1004, the image forming apparatus Ln (n=0) to be processed is set. In step S1005, the job information acquisition unit 504 acquires job information of the image forming apparatus Ln to be processed. In step S1006, the execution job identification unit 509 determines whether there is a print job which is being executed. If there is the print job which is being executed (YES in step S1006), the processing proceeds to step S1007. In step S1007, the job control unit 510 suspends the print job which is being executed.

Instep S1008, the operation information acquisition unit 511 acquires only a part of the operation information varying in printing. In step S1009, the job sequence management unit 505 determines to store the sequence of the snapshot generation job in the heading of the job queue. In step S1010, the job sequence management unit 505 changes the snapshot generation job to the heading of the job queue.

In step S1011, the job control unit 510 resumes the print job which is being suspended. In step S1012, the job completion detection unit 506 registers a monitoring event of the snapshot generation job in the image forming apparatus 100. In step S1013, the job completion detection unit 506 increments the value of n by one to shift the image forming apparatus 100 to be processed to the next one. In step S1014, the job completion detection unit 506 determines whether the value of n is equal to that of N to confirm whether the process of all image forming apparatuses 100 from which the snapshot generation job needs to be acquired is completed. If the process of all image forming apparatuses 100 is completed (YES in step S1014), the processing proceeds to step S1015.

In step S1015, the job completion detection unit 506 determines whether to receive the completion notification of the snapshot generation job. If the completion notification is received (YES in step S1015), the processing proceeds to step S1016. In step S1016, the snapshot acquisition unit 507 acquires the snapshot from the image forming apparatus 100 from which the completion notification is received.

In step S1017, the job completion detection unit 506 determines whether to receive the completion notification of the snapshot generation job from all image forming apparatuses 100. If the completion notification is received from all image forming apparatuses 100 (YES in step S1017), the processing proceeds to step S1018. In step S1018, the operation information determination unit 512 replaces the value of a part of the operation information acquired by the processing in step S1008 with that of the snapshot for each item, and ends the processing.

Figure 14:
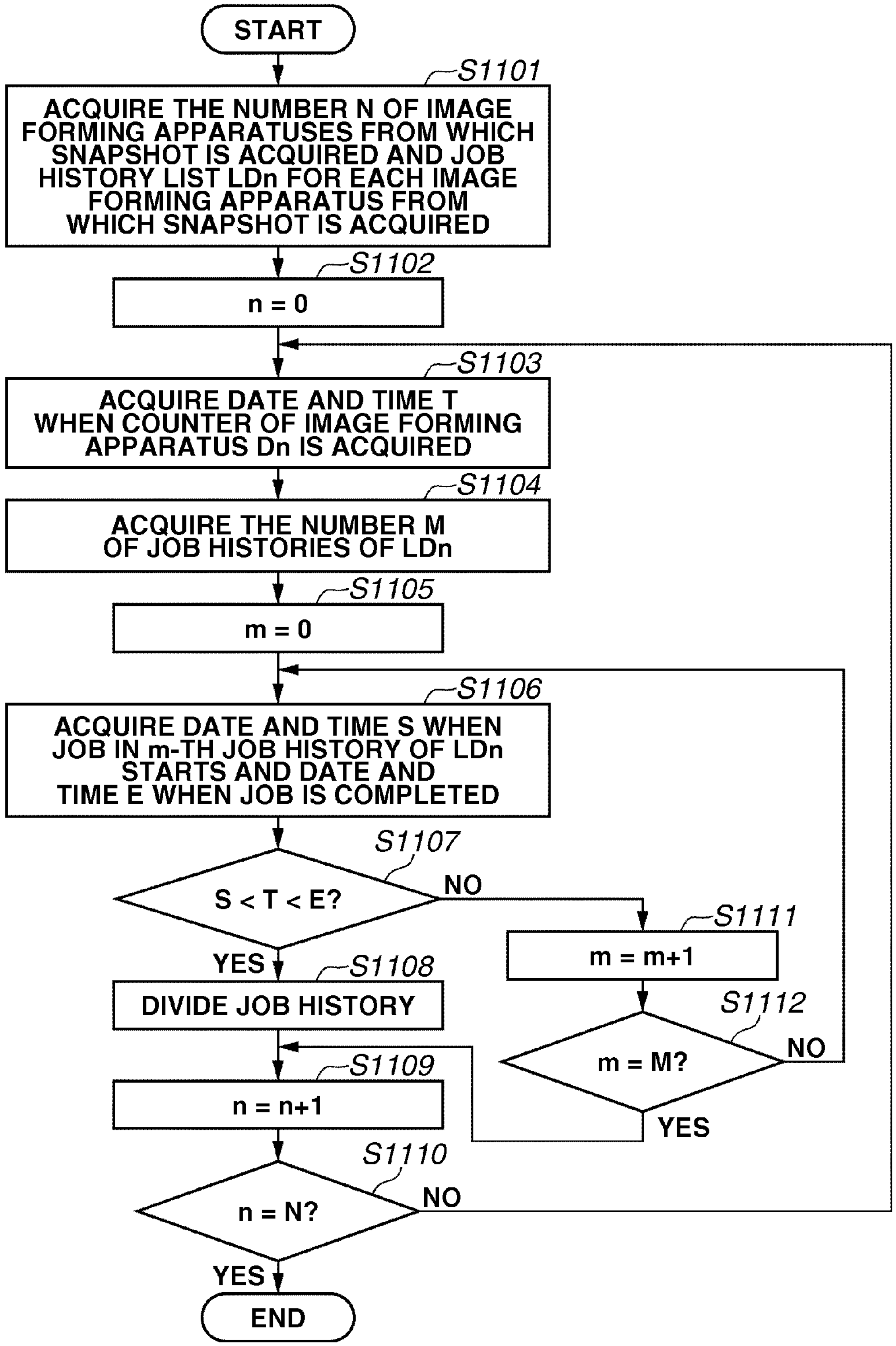
FIG. 14 is a flowchart illustrating division processing of a job history in the monitoring apparatus according to the second exemplary embodiment.

An example of the dividing processing of a job history in the job history management unit 513 according to the present exemplary embodiment is described in detail below with reference to the flowchart of FIG. 14.

In step S1101, the number N of the targeted image forming apparatuses 100 and a job history list LDn for each targeted image forming apparatus Dn are acquired. In step S1102, a variable n is set to zero (n=0) and the image forming apparatus to be processed is set to a first one. In step S1103, a counter acquisition date and time T of the image forming apparatus Dn is acquired. In step S1104, The number M of job histories of the job history list LDn is acquired.

In step S1105, a variable m is set to zero (m=0) and set to first information of the job history list. In step S1106, a date and time S when a job in the m-th job history of LDn starts and a date and time E when job is completed are acquired. In step S1107, if the counter acquisition date and time T is latter than the job-start date and time S, and the job-completion date and time E is latter than the counter acquisition date and time T (YES in step S1107), the processing proceeds to step S1108. In step S1108, the job history management unit 513 divides the m-th job history into two job histories before and after the date and time when the snapshot is acquired based on the acquired operation information and the value of the snapshot.

In step S1109, the value of n is incremented by one, and the image forming apparatus to be processed is shifted next. In step S1110, it is determined whether the value of n is equal to that of N to confirm whether the process of all targeted image forming apparatuses 100 is completed. If the value of n is equal to that of N (YES in step S1110), the processing ends. If the value of n is not equal to that of N (NO in step S1110), the processing returns to step S1103.

In step S1107, if the condition is not satisfied that the counter acquisition date and time T is latter than the job-start date and time S and the job-completion date and time E is latter than the counter acquisition date and time T (NO in step S1107), the processing proceeds to step S1111. Instep S1111, the value of m is incremented by one and information in the job history list is set to the next one.

In step S1112, it is determined whether the value of m is equal to that of M to confirm if the confirmation of information in all job history lists is completed. If the value of m is equal to that of M (YES in step S1112), the processing proceeds to step S1109. If the value of m is not equal to that of M (NO in step S1112), the processing returns to step S1106.

As described above, a well-matched value between the job history and the counter information can be acquired at a date and time closer to the date and time when the counter information needs to be acquired.

The methods of the first and second exemplary embodiments described above may not be used depending on the image forming apparatus 100. For this reason, a command for determining whether the processing of the present invention can be performed by the image forming apparatus 100 is previously transmitted to the image forming apparatus 100 and, if the present exemplary embodiment can be applicable, it may be determined whether the method of the present invention is used. If the present exemplary embodiment cannot be applicable, the method of the present invention may be replaced with a conventional method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-226041 filed Oct. 13, 2011 and No. 2012-197268 filed Sep. 7, 2012, which are hereby incorporated by reference herein in their entirety.

What is claimed is:

1. A monitoring apparatus that acquires counter information from an image forming apparatus, the monitoring apparatus comprising:

a transmission unit configured to transmit a snapshot generation job for generating a snapshot indicating the counter information to the image forming apparatus, wherein the snapshot generation job is managed with a queue of the image forming apparatus for a print job related to printing processing and is restricted from being canceled by general user authority;

a suspension unit configured to perform a suspension operation for a print job being executed by the image forming apparatus;

a first acquisition unit configured to acquire a part of the counter information after the suspension operation;

a change unit configured to perform a changing operation for assigning the transmitted snapshot generation job to the top of the queue and resume the print job which has been suspended in the suspension operation;

a reception unit configured to receive a completion notification indicating completion of the snapshot generation job; and a second acquisition unit configured to acquire the snapshot indicating the counter information from the image forming apparatus in response to reception of the completion notification.

2. The monitoring apparatus according to claim 1, wherein, if a starting time, based on a predetermined date and time when the counter information is acquired, comes, the transmission unit transmits the snapshot generation job to the image forming apparatus.

3. A method for a monitoring apparatus that acquires counter information from an image forming apparatus, the method comprising:

transmitting a snapshot generation job for generating a snapshot indicating the counter information to the image forming apparatus, wherein the snapshot generation job is managed with a queue of the image forming apparatus for a print job related to printing processing and is restricted from being canceled by general user authority;

performing a suspension operation for a print job being executed by the image forming apparatus;

acquiring a part of the counter information after the suspension operation;

performing a changing operation for assigning the transmitted snapshot generation job to the top of the queue and resume the print job which has been suspended in the suspension operation;

receiving a completion notification indicating completion of the snapshot generation job; and acquiring the snapshot indicating the counter information from the image forming apparatus in response to reception of the completion notification.

4. The method according to claim 3, further comprising transmitting the snapshot generation job to the image forming apparatus, if a starting time, based on a predetermined date and time when the counter information is acquired, comes.

5. A nontransitory computer-readable storage medium storing a computer program for causing a computer to execute a method for a monitoring apparatus that acquires counter information from an image forming apparatus, the method comprising:

transmitting a snapshot generation job for generating a snapshot indicating the counter information to the image forming apparatus, wherein the snapshot generation job is managed with a queue of the image forming apparatus for a print job related to printing processing and is restricted from being canceled by general user authority;

performing a suspension operation for a print job being executed by the image forming apparatus;

acquiring a part of the counter information after the suspension operation;

performing a changing operation for assigning the transmitted snapshot generation job to the top of the queue and resume the print job which has been suspended in the suspension operation;

receiving a completion notification indicating completion of the snapshot generation job; and acquiring the snapshot indicating the counter information from the image forming apparatus in response to reception of the completion notification.

* * * * *